(12) United States Patent
Bernstein et al.

(10) Patent No.: US 11,169,188 B2
(45) Date of Patent: Nov. 9, 2021

(54) LOW-OBSERVABILITY MATRIX COMPLETION

(71) Applicant: Alliance for Sustainable Energy, LLC, Golden, CO (US)

(72) Inventors: Andrey Bernstein, Golden, CO (US); Yingchen Zhang, Golden, CO (US); Andreas Joachim Schmitt, Vancouver, WA (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 16/246,998

(22) Filed: Jan. 14, 2019

(65) Prior Publication Data

US 2020/0025810 A1   Jan. 23, 2020

Related U.S. Application Data

(60) Provisional application No. 62/616,879, filed on Jan. 12, 2018.

(51) Int. Cl.
| | |
|---|---|
| *G05B 15/02* | (2006.01) |
| *G01R 21/133* | (2006.01) |
| *H02J 3/00* | (2006.01) |
| *H02J 13/00* | (2006.01) |
| *H04B 3/54* | (2006.01) |
| *G02B 6/38* | (2006.01) |

(52) U.S. Cl.
CPC ....... *G01R 21/1331* (2013.01); *G02B 6/3834* (2013.01); *G02B 6/3861* (2013.01); *G02B 6/3862* (2013.01); *G02B 6/3885* (2013.01); *G05B 15/02* (2013.01); *H02J 3/00* (2013.01); *H02J 13/0006* (2013.01); *H04B 3/542* (2013.01); *H02J 2203/20* (2020.01)

(58) Field of Classification Search
None
See application file for complete search history.

(56) References Cited

U.S. PATENT DOCUMENTS

| | | | |
|---|---|---|---|
| 2007/0088999 A1 | 4/2007 | Chao et al. | |
| 2007/0096747 A1* | 5/2007 | Wells | G01R 23/04 |
| | | | 324/520 |

(Continued)

OTHER PUBLICATIONS

Schmitt et al., "Matrix Completion for Low-Observability Voltage Estimation", available at https://arxiv.org/abs/1801.09799, Jan. 29, 2018, pp. 1-8.

(Continued)

*Primary Examiner* — Ryan A Jarrett
(74) *Attorney, Agent, or Firm* — Robert G. Pittelkow

(57) ABSTRACT

An example device includes at least one processor configured to receive electrical parameter values corresponding to at least one first location within a power network. The at least one processor is further configured to determine, using matrix completion and based on the at least one electrical parameter value, an estimated value of at least one unknown electrical parameter. The at least one unknown electrical parameter corresponds to a second location within the power network. The at least one processor is also configured to cause at least one device within the power network to modify operation based on the estimated value of the at least one unknown electrical parameter.

11 Claims, 9 Drawing Sheets

(56) References Cited

U.S. PATENT DOCUMENTS

| | | | | |
|---|---|---|---|---|
| 2008/0140326 A1* | 6/2008 | Scholtz | ................ | G01R 25/00 |
| | | | | 702/60 |
| 2012/0022713 A1* | 1/2012 | Deaver, Sr. | ............ | G05B 17/02 |
| | | | | 700/298 |
| 2013/0035885 A1* | 2/2013 | Sharon | ..................... | H02J 3/46 |
| | | | | 702/61 |
| 2013/0304266 A1* | 11/2013 | Giannakis | ............ | G01R 21/133 |
| | | | | 700/286 |
| 2014/0032187 A1* | 1/2014 | Legbedji | ................ | G06F 30/20 |
| | | | | 703/2 |
| 2014/0244189 A1* | 8/2014 | Chiang | ............. | G01R 19/2513 |
| | | | | 702/61 |
| 2015/0339419 A1 | 11/2015 | Korobkov et al. | | |
| 2016/0126739 A1* | 5/2016 | Shi | ........................... | H02J 3/28 |
| | | | | 307/31 |

OTHER PUBLICATIONS

International Search Report and Written Opinion for corresponding PCT application No. PCT/US19/013458 dated Mar. 27, 2019, pp. 1-8.

* cited by examiner

LOW-OBSERVABILITY MATRIX COMPLETION

CROSS-REFERENCE TO RELATED APPLICATIONS

This application claims the benefit of U.S. Provisional Application No. 62/616,879, titled "MATRIX COMPLETION FOR LOW-OBSERVABILITY VOLTAGE ESTIMATION" and filed Jan. 12, 2018, the entire content of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

In today's world, even modest housing may have photovoltaic (PV) systems and/or wind turbines installed to reduce dependence on the grid, and to offset energy costs. Power generation continues to be increasingly distributed and power networks are becoming larger and more complex. As a result, grid managers may have to deal with increasingly complex systems while maintaining efficiency and quality of service. Further, grid managers may have to do so while relying on existing monitoring infrastructure or on minimal upgrades.

SUMMARY

In one example, a device includes at least one processor configured to receive at least one electrical parameter value corresponding to at least one first location within a power network. The processor may be further configured to determine, using matrix completion, based on the at least one electrical parameter value, an estimated value of at least one unknown electrical parameter. The at least one unknown electrical parameter corresponds to a second location within the power network. The processor may be further configured to cause at least one device within the power network to modify operation based on the estimated value of the at least one unknown electrical parameter.

In another example, a method includes receiving, by a power network management system comprising at least one processor, at least one electrical parameter value corresponding to at least one first location within a power network. The method may also include determining, by the power network management system, using matrix completion, based on the at least one electrical parameter value, an estimated value of at least one unknown electrical parameter. The at least one unknown electrical parameter corresponds to a second location within the power network. The method may also include causing, by the power network management system, at least one device within the power network to modify operation based on the estimated value of the at least one unknown electrical parameter.

The details of one or more examples are set forth in the accompanying drawings and the description below. Other features, objects, and advantages will be apparent from the description and drawings, and from the claims.

DETAILED DESCRIPTION

Figure 1:
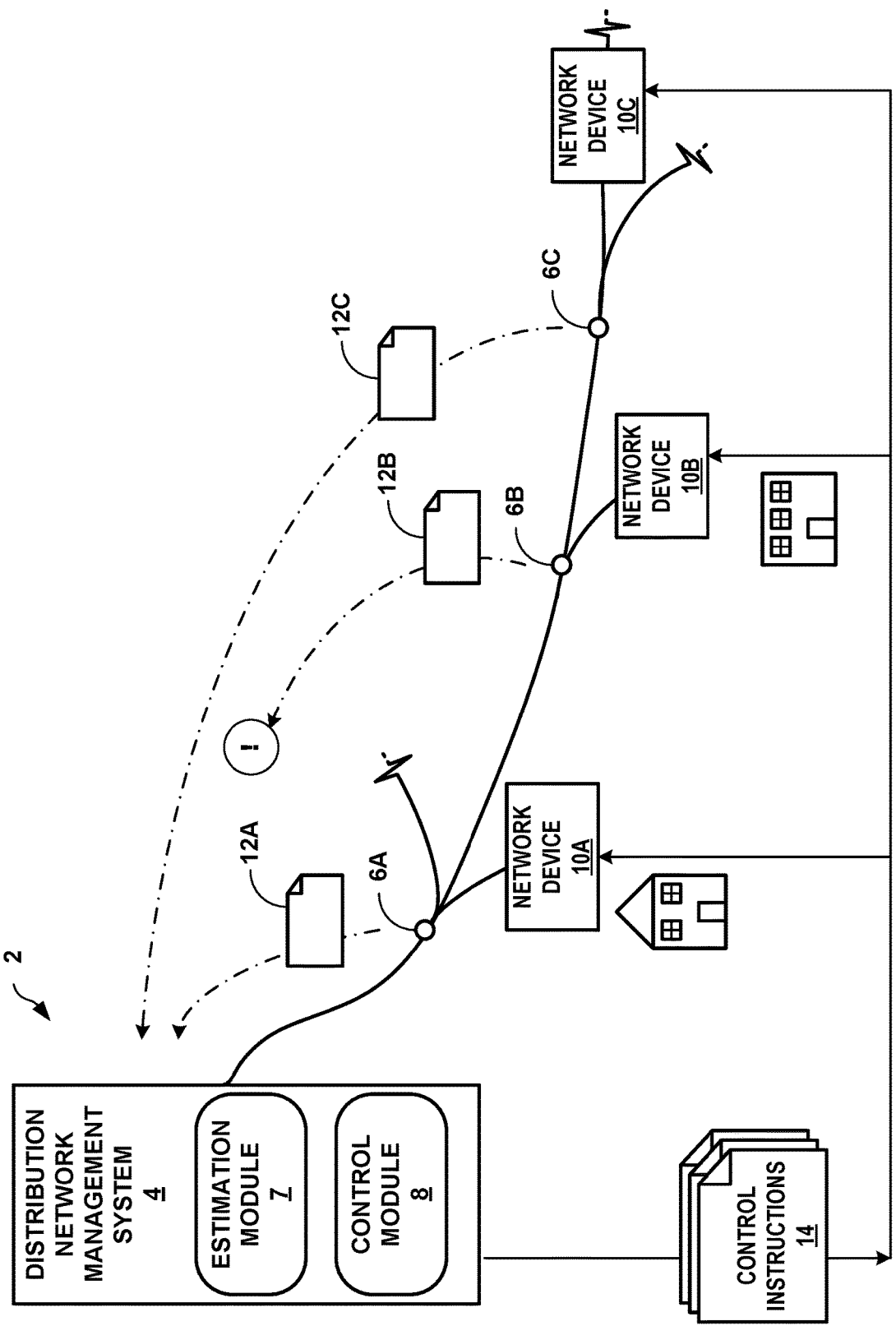
FIG. 1 is a conceptual diagram illustrating an example power distribution network management system configured to manage a power network using low-observability matrix completion, in accordance with one or more aspects of the present disclosure.

The present disclosure provides matrix completion techniques for estimating unknown quantities in a system based on known quantities in the system. For instance, the techniques described herein may be used to estimate voltage phasors in a power system under low-observability conditions. The estimated voltage phasors may be used to control devices within the power system to achieve improved power management and distribution. As a specific example, a power distribution network management system may be configured to receive measurements of electrical parameters corresponding to locations throughout the distribution network and determine operating setpoints for devices in the distribution network. However, due to communication errors, sensor failures, or other issues, the management system may not receive all of the expected measurements. In accordance with the techniques of the present disclosure, the management system may be configured to estimate values for measurements that were not received, based on the measurements that were received. The management system may then determine operating setpoints for the devices in the distribution network based at least in part on the estimated values.

Traditional state estimation techniques require full observability. That is, the number of measured values has to be equal or to exceed the number of quantities to be estimated. That is not necessarily realistic—especially in power distribution networks. However, the amount of information about such systems is growing in the form of increased smart meter use, distributed generation sources, and other data sources. It may be possible to use this wide variety of information to estimate the voltage phasors within such a network. The techniques described herein utilize a matrix completion approach (a tool for estimating missing values in low rank matrices) to accomplish this. As described herein, the matrix completion techniques are augmented with power-flow constraints, which provide an additional link between parameter values. This improves the accuracy of estimation while requiring less data.

Observability in the power grid has been a constant issue since its inception. Knowledge of the present state of the grid allows for optimal grid operations, including power flow management and efficiency and service resilience and reliability. Related-art state estimation techniques typically require full network observability in order to produce accurate results. However, obtaining full observability, particularly in a distribution network, is not feasible due to the immense scale of the network and limited availability of phasor measurement units (PMUs). Therefore, it has become imperative to be capable of computing state estimation for cases of low observability.

The structured approach disclosed herein addresses the low observability problem while providing the following benefits compared to related-art techniques:

The techniques described herein allow for voltage estimation from whichever measurements are available. As the number of measurement devices increases, regardless of quantity being measured, this data can be used as a supplement to estimate the voltage phasors in the entire system.

The inclusion of power-flow constraints allows the techniques of the present disclosure to use smaller amounts of data for accurate estimation when compared to typical "black box" machine learning methods.

The disclosed approach can be used to determine both voltage magnitude and phase angle in systems with few voltage phasor measurements.

It is further worth emphasizing that the versatility of the matrix completion approach described herein allows use of any measurement that may be available in the field in order to perform the state estimation task. This is in contrast to many related-art techniques that make use of only voltage and real/reactive power measurements for the purpose of estimation.

FIG. 1 is a conceptual diagram illustrating an example power distribution network management system (e.g., system 4) configured to manage a power network (e.g., network 2) using low-observability matrix completion, in accordance with one or more aspects of the present disclosure. In the example of FIG. 1, network 2 includes distribution network management system 4 and nodes 6A-6C (collectively "nodes 6"). Network 2 also includes network devices 10A, 10B, and 10C (collectively "network devices 10"). Distribution network management system 4, nodes 6, and network devices 10 may be interconnected through one or more distribution lines, as illustrated in FIG. 1.

Network 2 represents a simplified power distribution network, and may, in some examples, include any number of additional ones of nodes 6, network devices 10, and/or other components. That is, while shown as having three nodes and three network devices, network 2 may include more or fewer nodes, network devices, and/or other components in other examples. Additionally, FIG. 1 illustrates only one example of a power distribution network management system configured to perform the techniques described herein, and various other systems may be used in accordance with the present disclosure. Furthermore, the techniques described herein may be utilized by devices other than a distribution network management system. For example, the techniques of the present disclosure may, in various examples, be embodied in one or more other devices within a distribution network, in one or more devices of a power transmission network, or one or more devices of any other power network.

In the example of FIG. 1, nodes 6 represent devices configured to measure values of one or more electrical parameters at a location of network 2 and output electrical parameter values. In various examples, electrical parameters may include real and reactive powers, voltage magnitudes, phases, and/or phasors, current magnitudes, phases, and/or phasors, or any other electrical quantities that provide information about the status of a location in a power network. Nodes 6 may be located at any point in network 2. In some examples, one or more of nodes 6 may be in the middle of a distribution line. In some examples, one or more of nodes 6 may be at a junction of two or more distribution lines. Examples of nodes 6 include phasor measurement units, inverters, power substations, and any other systems or devices capable of measuring or determining electrical parameter values at a location in network 2.

In the example of FIG. 1, distribution network management system 4 represents a system configured to manage a power distribution network to provide power to customers. For example, network 2 shown in FIG. 1 may be connected to a power transmission network (not shown). Distribution network management system 4 may manage the receipt and distribution of power from the transmission network while avoiding overloading network 2 and ensuring that customers' power needs are met.

In some examples, distribution network management system 4 may represent a system owned and operated by a utility company. In other examples, distribution network management system 4 may be owned and/or operated by another entity. For instance, distribution network management system 4 may represent an access point of a power network of a business park or corporate campus. As another example, distribution network management system 4 may manage a micro-grid, such as may be employed on a military base, mobile hospital, or other small area in which electrical power may be desirable. In other words, distribution network management system 4 may represent any system configured to manage power distribution via a distribution network.

Distribution network management system 4 may be a computing device, such as a server computer, a desktop computer, or any other device capable of implementing some or all of the techniques described herein. In some examples, distribution network management system 4 may represent a cloud computing environment. That is, while shown as a single component in the example of FIG. 1, distribution network management system 4 may, in other examples, be a group of distributed computing resources that communicate with one another.

As shown in the example of FIG. 1, distribution network management system 4 includes estimation module 7 and control module 8. Estimation module 7 may represent a combination of software and/or firmware and hardware that is configured to estimate unknown electrical parameters in a system based on known electrical parameters of the system, in accordance with the techniques described herein. Control module 8 may represent a combination of software and/or firmware and hardware that is configured to cause one or more devices within network 2 to modify operation based on electrical parameters of network 2.

In the example of FIG. 1, network devices 10 represent electrical components within network 2 that are operable to modify their operation. Examples of network devices 10 include power generation sources, power inverters (e.g., that connect photovoltaic devices to network 2), controllable loads (e.g., energy storage systems, industrial equipment, etc.), connection devices (e.g., switching gear, etc.), curtailable loads, and any other equipment that may be operated to manage a power network.

Nodes 6, in the example of FIG. 1, may measure respective electrical parameter values 12A-12C (collectively "electrical parameter values 12") on an iterative basis. Each electrical parameter value may represent the present value of the electrical parameter at a particular location in network 2. In accordance with the techniques described herein, nodes 6 may output electrical parameter values 12. In the example of FIG. 1, for instance, nodes 6 may transmit electrical parameter values 12 to distribution network management system 4 using wireless and/or wired communication. In other examples, nodes 6 may additionally or alternatively transmit electrical parameter values 12 to one or more other components of network 2.

In accordance with the techniques described herein, distribution network management system 4 may receive at least one electrical parameter value corresponding to at least one first location within a power network. For instance, distribution network management system 4 may receive electrical parameter values 12A and 12C corresponding to the locations of nodes 6A and 6C, respectively. However, as shown in the example of FIG. 1, distribution network management system 4 may fail to receive electrical parameter values 12B. Failure to receive certain electrical parameter values may occur for any number of reasons in various examples. For instance, in the example of FIG. 1, the connection between node 6B and distribution network management system 4 may fail. In some examples, a device configured to measure and send electrical parameter values may malfunction and fail to send electrical parameter values. In some examples, there may not be any device at a particular location within network 2 that is operable to measure or send electrical parameter values, but it may still be desirable to determine electrical parameter values for such location. In some examples, distribution network management system 4 may receive electrical parameter values, but the values may be corrupted, clearly inaccurate, or otherwise unusable. That is, in some examples distribution network management system 4 may receive parameter values but be unable to use the values for some reason.

Distribution network management system 4 may determine, using matrix completion and based on the at least one electrical parameter value, an estimated value of at least one unknown electrical parameter. The at least one unknown electrical parameter may correspond to a second location within the power network. For instance, estimation module 7 of distribution network management system 4 may receive electrical parameter values 12A and 12C. Based on the received electrical parameter values, estimation module 7 may estimate one or more electrical parameter values that correspond to the location of node 6B through the low-observability matrix completion techniques described herein.

Distribution network management system 4 may cause at least one device within the power network to modify operation based on the estimated value of the at least one unknown electrical parameter. For instance, control module 8 may receive electrical parameter values 12A and 12C and receive the estimated electrical parameter values that correspond to the location of node 6B. Based on these received values, control module 8 may output control instructions 14 that may cause one or more of network devices 10 to modify operation.

In various examples, distribution network management system 4 may cause devices within network 2 to modify operation based on the estimated electrical parameter values corresponding to the location of node 6B through various means. As one specific example, distribution network management system 4 may be configured to operate in conjunction with other devices in network 2 to seek OPF-based targets through gather and broadcast techniques. That is, distribution network management system 4 may receive one or more electrical parameter values of network 2 (e.g., from nodes 6), estimate values for one or more unknown electrical parameters of network 2 using the techniques described herein, determine setpoint coefficients for various devices in network 2, and output the coefficients to the devices in network 2 (e.g., network devices 10) to cause the devices to modify operation based at least in part on the estimated values for the one or more unknown electrical parameters. As another specific example, distribution network management system 4 may output the estimated electrical parameter values corresponding to the location of node 6B to distribution system operators, receive input with instructions on how to manage network 2, and act on such instructions, thereby causing devices within network 2 to modify operation based on the estimated electrical parameter values. As another example, distribution network management system 4 can use the estimated electrical parameter values and some other historical data to forecast and predict the behavior of the distribution network. As yet another example, distribution network management system 4 can use the estimated electrical parameter values to estimate/detect failures and attacks on the grid.

While certain operations are described in the example of FIG. 1 as being performed by distribution network management system 4, these operations may, in other examples, be performed by one or more other components of network 2, or by components not shown in FIG. 1. In some examples, for instance, each of nodes 6 and/or network devices 10 may be configured to electrical parameter values 12, determine estimated values of unknown electrical parameters, and modify their own operation based on the estimated electrical parameter values. In yet another example, some of these operations may be performed by one or more standalone computing devices (not shown) that communicate with the other components of network 2. This may be the case when, for example, one or more of the components within network 2 are legacy devices that do not have sufficient computing power or communications abilities.

Distribution network management system 4 may receive electrical parameter values and cause devices to modify operation in an iterative fashion that allows system 2 to seek OPF targets in real-time or near-real-time. That is, the techniques described herein may be performed on a relatively fast time scale, thereby allowing more efficient operation when pursuing operating targets (e.g., avoiding physical constraints and other management or consumer objectives). For instance, distribution network management system 4 may perform low-observability matrix completion operations every second, every millisecond, or at some other interval. Additionally, in some examples, different components of system 2 may perform operations at different intervals while in other examples, all components of system 2 may generally perform the operations described herein with the same frequency.

In some examples, distribution network management system 4 may determine estimated electrical parameter values for unknown electrical parameters each iteration. This may be the case, for instance, when a location in network 2 is incapable of measuring and providing such parameter values. In some examples, distribution network management system 4 may not determine estimated electrical parameter values for unknown electrical parameters on each iteration. As one specific example, if distribution network management system 4 receives all information expected or determines that it has sufficient information to fully represent a state of network 2, distribution network management 4 may not determine the estimated values in that iteration. As another specific example, distribution network management system 4 may only determine estimated values periodically (e.g., every other iteration, every five iterations, or with some other frequency).

By determining estimated values of unknown electrical parameters in a power network, the techniques of the present disclosure may allow for more consistent real-time network management by obviating the need for complete information with every iteration. Furthermore, by causing devices within network 2 to modify operation based on estimated values, the low-observability matrix completion techniques described herein may provide more efficient performance of power networks. This, in turn, may reduce costs to network managers and ensure more resilience for consumers.

The mathematical development of the estimation techniques described herein is detailed below. The goal of matrix completion, generally, is to determine, given a low rank matrix with a set of known elements $\Omega$, the unknown elements. The difficulty lies in the required number of observations and the assumption of low rank. Since unknown elements are being estimated through the use of known elements, there both has to be enough known elements to make such an estimation possible and a correlation between the elements in order to obtain an accurate estimation.

To define the matrix completion problem formally, consider the space of real-valued $n_1 \times n_2$ matrices $\mathbb{R}^{n_1 \times n_2}$. Let $\mathcal{J} := \{1, \ldots, n_1\} \times \{1, \ldots, n_2\}$ denote the index set, so that $(i,j) \in \mathcal{J}$ represents an element's index. For any matrix $W \in \mathbb{R}^{n_1 \times n_2}$ and a subset $\Omega \subseteq \mathcal{J}$, let $W_\Omega$ denote $$W_\Omega = \begin{cases} W_{i,j}, & (i,j) \in \Omega \\ 0, & \text{otherwise.} \end{cases} \tag{1}$$

Let M be the original matrix to complete, $\Omega$ be the set of elements with observed values, and $M_\Omega$ be the observation matrix, such that elements where data is available are set to the observed value and the remaining elements are set to zero. The problem of matrix completion can then be formulated as a rank minimization problem:

$$\min_{X \in \mathbb{R}^{n_1 \times n_2}} \operatorname{rank}(X) \tag{2}$$
$$\text{s.t.} \quad X_\Omega = M_\Omega,$$

However, it can be seen that the formulation of (2) is a non-convex, NP-hard optimization problem to solve, which makes it unusable for implementation. An alternative approach to circumvent this problem is to minimize the nuclear norm of the matrix:

$$\min_{X \in \mathbb{R}^{n_1 \times n_2}} \|X\|_* \tag{3}$$
$$\text{s.t.} \quad X_\Omega = M_\Omega,$$

where $$\|X\|_* = \Sigma_{i=1}^n \sigma_i(X) \tag{4}$$

and $\sigma_i(X)$ is the $i^{th}$ singular value and $n := \min\{n_1, n_2\}$.

Due to the nature of the equality constraint, formulation (3) is highly susceptible to noise. To alleviate this, the techniques described herein employ a robust algorithm to handle noisy measurements. The algorithm modifies the equality constraint in (3) to $$\|X_\Omega - M_\Omega\|_F \le \delta \tag{5}$$

where $\|X\|_F$ is the Frobenius norm of X which is defined as $$\|X\|_F = \sqrt{\Sigma_{i=1}^m \Sigma_{j=1}^n |X_{i,j}|^2}.$$

The accuracy of the estimations is highly correlated to the value of δ selected. Since the value of δ corresponds to the amount of noise in the measurements, the accuracy of the estimation naturally increases when δ becomes closer to zero. In some examples, bad data detection may be used to improve accuracy. That is, bad data can be addressed through the exclusion of data points when they are significantly different than what should be reasonable. Typically, however, if there are enough measurements available, the techniques described herein are robust against bad data points.

The overarching idea of the new matrix-completion-based approach for voltage estimation under low observability described herein is to augment the matrix completion problem presented above with power-flow constraints in order to obtain better accuracy while requiring less data.

For brevity, a balanced network with a single slack bus and N, PQ buses is considered in the present disclosure. Let $\mathcal{N} = \{1, \ldots, N\}$ denote the set of the PQ buses, and $\mathcal{L} \subseteq \mathcal{N} \times \mathcal{N}$ denote the set of distribution lines. Note, however, that the formulation provided herein can be easily extended to the general multiphase setting with both wye and delta connections.

The selection of proper matrix variables is important to accurate matrix completion results. Since the objective of the estimation is to determine the voltages at each bus, parameters which have a correlation to the voltage should be selected to obtain the most accurate results.

In some examples, the matrix may be set up in terms of system connection lines rather than buses. This may allow for the use of the largest number and variety of variables. In this way, each row of the matrix represents one line in the system, and each column represents one variable. The matrix will need to be modified as the topology of the system changes, but this is done simply with the inclusion and removal of rows within the matrix.

In the present example, the resultant matrix columns are selected as: the real and reactive voltage from the source bus of the line, the total real and reactive power entering the line source bus from all sources (generators and lines), the real and reactive current flowing through the line, the power flowing through the line, the load at the source bus, and the voltage magnitude at the source bus. Formally, for every line $(f,t) \in \mathcal{L}$, the corresponding row in the matrix M is given by $[\text{Re}(V_f), \text{Im}(V_f), P_{in_f}, Q_{in_f}, \text{Re}(I_{f,t}), \text{Im}(I_{f,t}), P_{flow_{f,t}}, Q_{flow_{f,t}}, P_{load_f}, Q_{load_f}, |V_f|]$. Note that the techniques of the present disclosure are not limited to the variables selected above. In fact, any variables which have a correlation with voltage can be used to supplement and improve the results.

In the present example, several corresponding constraints to be included in the original formulation are formulated next. First, since the objective matrix contains both the voltages at each bus and the current flowing between buses, the power flow constraints can be introduced to the optimization in the form of the following linear equality constraint:

$$(V_f - V_t) Y_{ft} = I_{f,t}, \forall (f,t) \in \mathcal{L} \quad (7)$$

However, the inclusion of this constraint might result in the infeasibility of the problem. To increase the robustness of the disclosed techniques against varying system conditions and measurement noise, the power flow equality constraints may be relaxed and bounded by a tolerance. The new constraint then becomes $$-\epsilon_{f,t} \leq (V_f - V_t) Y_{ft} - I_{f,t} \leq \epsilon_{f,t}, \forall (f,t) \in \mathcal{L}, \quad (8)$$

where $\epsilon_{f,t}$ is the error tolerance for line $(f,t) \in \mathcal{L}$.

Additionally, it is a natural requirement for there to be net zero power at each bus. Thus, the power flowing into the bus must be equal to the power consumed at the bus plus the power leaving the bus. This can be formulated as $$P_{in_f} - \Sigma_{t \in \mathcal{N}} P_{flow_{f,t}} - P_{load_f} = 0, \forall f \in \mathcal{N}$$

$$Q_{in_f} - \Sigma_{t \in \mathcal{N}} Q_{flow_{f,t}} - Q_{load_f} = 0, \forall f \in \mathcal{N} \quad (9)$$

Similar to constraint (8), these equality constraints can be relaxed as follows:

$$-\tau_f \leq P_{in_f} - \Sigma_{t \in \mathcal{N}} P_{flow_{f,t}} - P_{load_f} \leq \tau_f \forall f \in \mathcal{N}$$

$$-\tau_f \leq Q_{in_f} - \Sigma_{t \in \mathcal{N}} Q_{flow_{f,t}} - Q_{load_f} \leq \tau_f \forall f \in \mathcal{N} \quad (10)$$

where $\tau_f$ is the error tolerance for bus $f \in \mathcal{N}$.

Feasibility can then be ensured by selecting tolerance values which create a feasible problem. However, since the accuracy of the resultant estimation is dependent on the tolerance being minimal, the values used need to be included in the optimization objective. Therefore, augmenting the original matrix completion problem (3), (5) with the power flow constraints, results in the following optimization problem:

$$\min_{X \in \mathbb{R}^{n_1 \times n_2}, \{\epsilon_{f,t}\}, \{\tau_f\}} \|X\|_* + w_1 \Sigma_{(f,t) \in \mathcal{L}} \epsilon_{f,t} + w_2 \Sigma_{f \in \mathcal{N}} \tau_f \quad (11a)$$

$$\text{s.t. } \|X_\Omega - M_\Omega\|_F \leq \delta \quad (11b)$$

$$(8), (10) \quad (11c)$$

$$\epsilon_{f,t} \geq 0, \forall (f,t) \in \mathcal{L} \quad (11d)$$

$$\tau_f \geq 0, \forall f \in \mathcal{N}, \quad (11e)$$

where $w_1, w_2 > 0$ are weighting parameters that are used to tune the trade-off between the accuracy of estimation and slackness of the optimization problem; $n_1 := |\mathcal{L}|$ is the number of lines in the network; and $n_2$ is the number of variables used for estimation. Observe that, since the measurements are in rectangular coordinates, (11) is a convex optimization problem and hence can be solved efficiently.

When the measurements of voltage magnitudes and/or power injections are available, formulation (11) can be augmented with additional constraints to capture the dependence between these variables. There are a number of different ways to include these constraints. Two such example ways are provided below: one that is applicable to only radial distribution networks and another one that is applicable to general systems.

With regard to radial networks, the LinDistFlow approximation for power-flow equations can be used under the assumption that the network is radial and of low power, as found in distribution networks. The LinDistFlow voltage approximation is given by $$|V_t| = |V_f| - \frac{(r_{f,t} P_{flow_{f,t}} + x_{f,t} Q_{flow_{f,t}})}{|V_0|} \quad (12)$$

where $V_0$ is the voltage magnitude at the feeder head, and $r_{f,t}$ and $x_{f,t}$ are the resistance and reactance of line $(f,t)$, respectively. This constraint is once again relaxed and added to the optimization problem, resulting in:

$$\min_{X\in\mathbb{R}^{n_1\times n_2},\{\epsilon_{f,t}\},\{\tau_f\}} \|X\|_* + w_1\Sigma_{(f,t)\in\mathcal{L}}\epsilon_{f,t} + w_2\Sigma_{f\in\mathcal{N}}\tau_f + w_3\Sigma_{(f,t)\in\mathcal{L}}\gamma_{f,t} \quad (13a)$$

$$\text{s.t. } (11b)-(11e) \quad (13b)$$

$$\left||V_t|-|V_f|+\frac{(r_{f,t}P_{flow_{f,t}}+x_{f,t}Q_{flow_{f,t}})}{|V_0|}\right| \le \gamma_{f,t}, \quad (13c)$$

$$\forall (f,t) \in \mathcal{L}$$

$$\gamma_{f,t} \ge 0, \forall (f,t) \in \mathcal{L} \quad (13d)$$

The inclusion of the voltage magnitude constraints for general networks is slightly more involved. In particular, linear approximations of both the voltage phasor and voltage magnitude can be defined as $$v \approx Mx+w$$

$$|v| \approx Kx+|w|, \quad (14)$$

where $v \in \mathbb{C}^N$ and $|v| \in \mathbb{R}^N$ are, respectively, the voltage phasors and magnitudes at all busses; $x \in \mathbb{R}^{2N}$ is the vector of active and reactive power injections at all buses; and the matrices $M \in \mathbb{C}^{N\times 2N}$, $K \in \mathbb{R}^{N\times 2N}$ and vectors $w \in \mathbb{C}^N$ and $|w| \in \mathbb{R}^N$ can be computed.

Considering these approximations as constraints, it is required once again to relax them, which yields the following optimization problem for general networks:

$$\min_{X\in\mathbb{R}^{n_1\times n_2},\{\epsilon_{f,t}\},\{\tau_f\}} \|X\|_* + w_1\Sigma_{(f,t)\in\mathcal{L}}\epsilon_{f,t} + w_2\Sigma_{f\in\mathcal{N}}\tau_f + w_3\gamma + w_4\alpha \quad (15a)$$

$$\text{s.t. } (11b)-(11e) \quad (15b)$$

$$\|v-Mx-w\|_\infty \le \gamma \quad (15c)$$

$$\||v|-Kx-|w|\|_\infty \le \alpha. \quad (15d)$$

Simulations were performed in both radial and mesh networks to show the viability of the disclosed techniques for both cases.

The test case for the radial network is the IEEE standard 33 bus system. Unless otherwise stated, all simulations were run under the assumption of a single voltage phasor measurement and 50% of the remaining quantities obtained through uniform random sampling for each case. In radial networks with low number of voltage phasor measurements, the voltage magnitude estimations were scaled to be within the proper range. Without voltage scaling, the magnitude estimations would still follow the proper trend. However, since the other quantities in the matrix can vary much more significantly, the estimations will be outside of the correct voltage range. This scaling can be done through $$V_{new} = V_{min} + (V_{max} - V_{min})\left(\frac{V_{old} - V_{est_{max}}}{V_{est_{max}} - V_{est_{min}}}\right). \quad (16)$$

Scaling may be necessary in radial systems with only two or fewer voltage phasor measurements. As the number increases beyond this, voltage scaling no longer becomes necessary. The magnitude measurement can be obtained from either the phasor measurement or the pure measurement. However, it is still important to have both the maximum and minimum voltage magnitude to obtain the optimal results when there are not enough phasor measurements.

Figure 2:
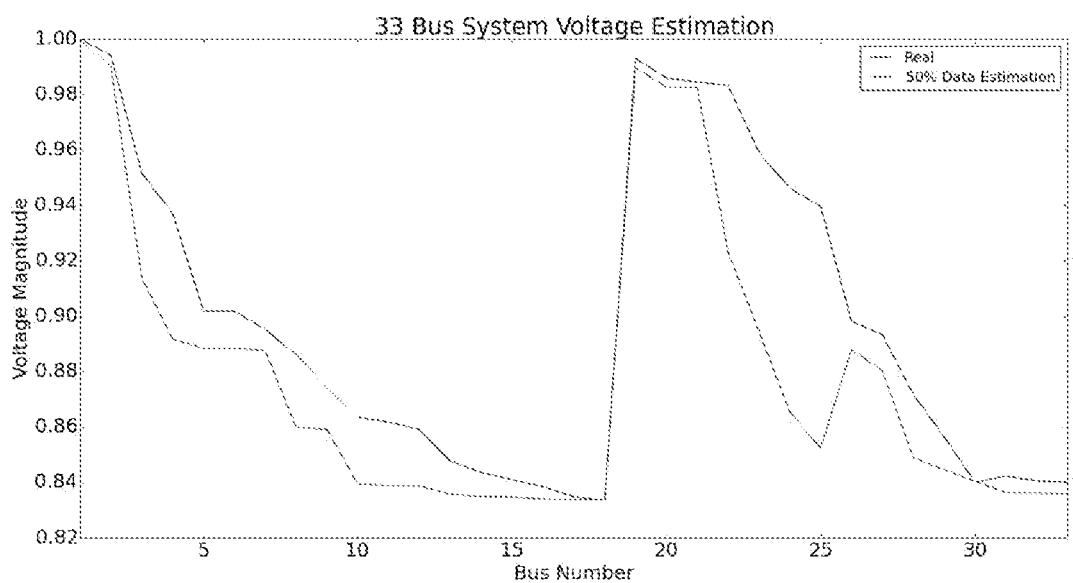
FIG. 2 is a graphical plot illustrating the real voltage magnitude at each bus of the IEEE standard 33 bus radial system as well as estimated magnitudes determined using low-observability matrix completion, in accordance with one or more aspects of the present disclosure.

FIG. 2 is a graphical plot illustrating the real voltage magnitude at each bus of the IEEE standard 33 bus radial system as well as estimated magnitudes determined using low-observability matrix completion, in accordance with one or more aspects of the present disclosure. Specifically, FIG. 2 shows the results of applying the matrix completion formulation (13) to the entire IEEE 33 bus system. It can be seen in FIG. 2 that the estimations follow reality very well. There are only occasional deviations from the true value, due to dependency on which data was available when making the estimation. These results were produced under the assumption that the data available was uniformly randomly sampled from the complete data set, which is not necessarily the case for real systems.

Figure 3:
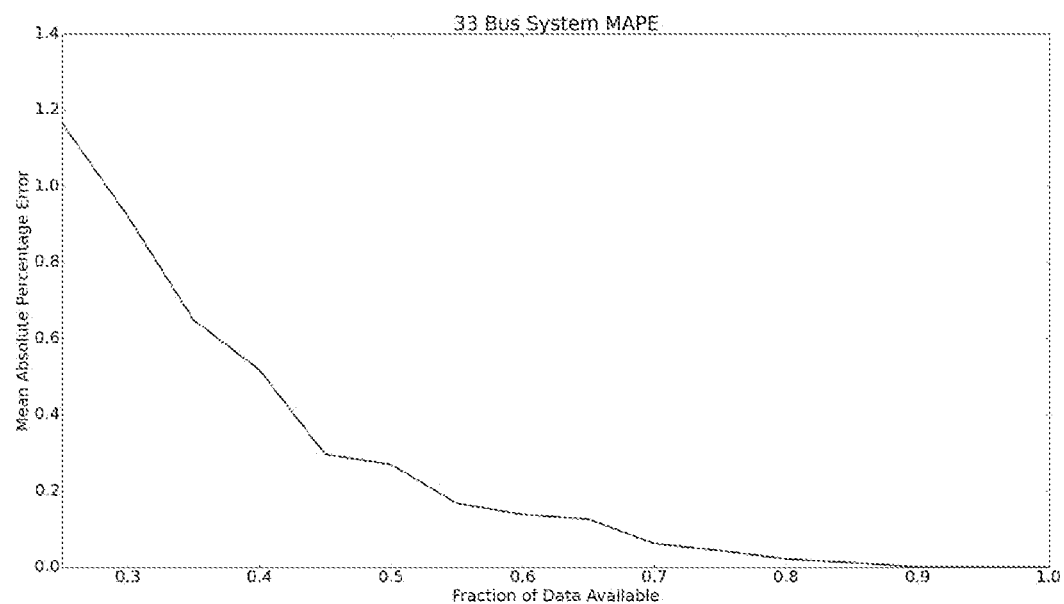
FIG. 3 is a graphical plot illustrating average error as a function of the available data when using low-observability matrix completion on the IEEE 33 bus system, in accordance with one or more aspects of the present disclosure.

FIG. 3 is a graphical plot illustrating average error as a function of available data when using low-observability matrix completion on the IEEE 33 bus system, in accordance with one or more aspects of the present disclosure. Specifically, FIG. 3 shows the impact of observability on the mean absolute percentage error (MAPE) of the estimations. As shown in FIG. 3, the MAPE is low even when only 50% of the electrical parameter values are known.

Figure 4:
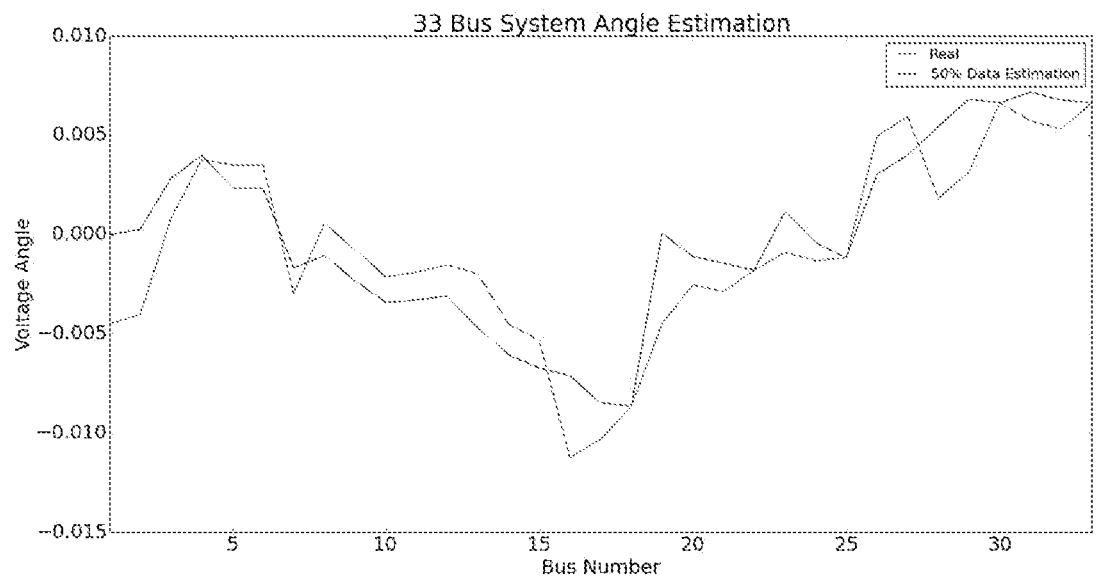
FIG. 4 is a graphical plot illustrating the real voltage angle at each bus of the IEEE 33 bus system as well as estimated angles determined using low-observability matrix completion, in accordance with one or more aspects of the present disclosure.

FIG. 4 is a graphical plot illustrating the real voltage angle at each bus of the IEEE 33 bus system as well as estimated angles determined using low-observability matrix completion, in accordance with one or more aspects of the present disclosure. The results in FIG. 4 show that the approach is applicable for angle estimations as well, with a slight increase on the noise of the estimations. In some examples, the amount of voltage phasor measurements necessary may be increased when estimating angle values. The plot in FIG. 4 was obtained with a voltage phasor measurement at Bus 1 and the ending Bus of all branches (18,22,25,33) in the IEEE 33 Bus system.

While the low-observability matrix completion techniques described herein result in accurate estimations, no algorithm would be acceptable without being able to handle error on the measurements. To show that the techniques of the present disclosure are robust against system errors, varying amounts of noise were added to the data. The noise was set to follow a normal distribution centered around the actual value with a standard deviation of a set percentage of the actual value. All plots were run using 50 percent data availability, while only a single voltage phasor measurement was used at bus 1. Additionally, the missing elements were the same for each case such that the only difference in estimations was the error.

Figure 5:
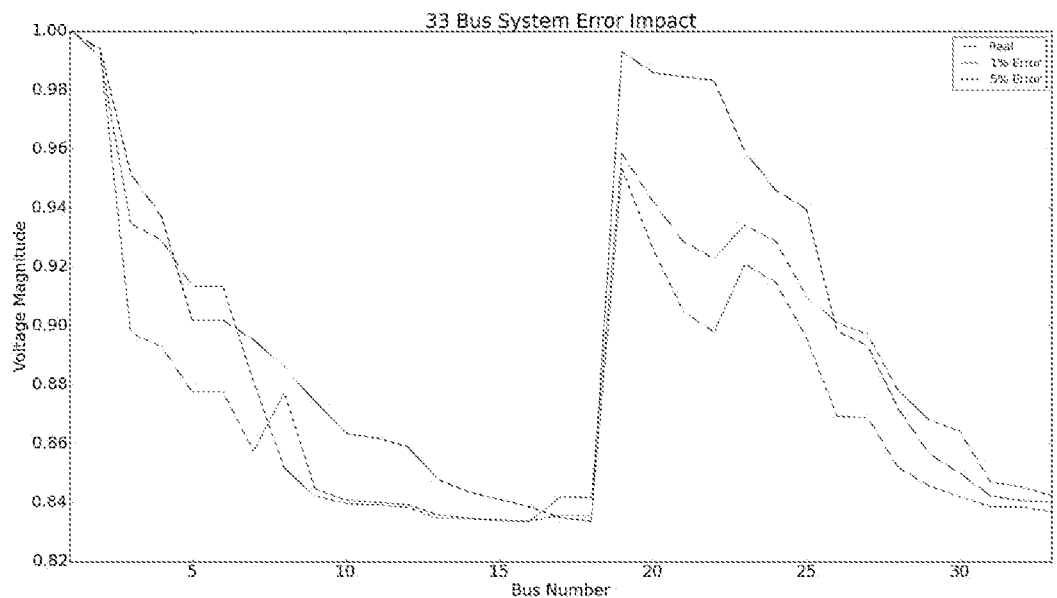
FIG. 5 is a graphical plot illustrating the real voltage magnitude at each bus of the IEEE 33 bus system as well as estimated magnitudes determined using low-observability matrix completion with 1% error introduced and with 5% error introduced, in accordance with one or more aspects of the present disclosure.

FIG. 5 is a graphical plot illustrating the real voltage magnitude at each bus of the IEEE 33 bus system as well as estimated magnitudes determined using low-observability matrix completion with 1% error introduced and with 5% error introduced, in accordance with one or more aspects of the present disclosure. From FIG. 5 it can be seen that while measurement errors do have some impact on the resultant estimation, the availability of data has a much more significant impact.

The results thus far have assumed only one single voltage phasor measurement to show the accuracy under minimal investment into new sensors in the system. However, as the number of voltage phasor measurements increases, the accuracy of the estimations increases significantly.

Figure 6:
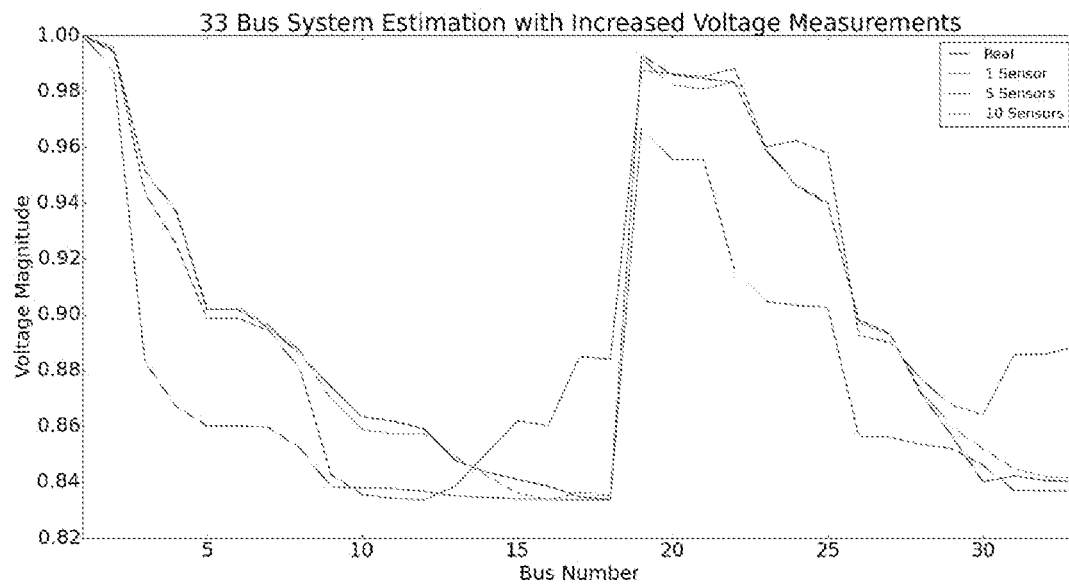
FIG. 6 is a graphical plot illustrating the real voltage magnitude at each bus of the IEEE 33 bus system as well as estimated magnitudes determined using low-observability matrix completion with different numbers of known phasor measurements, in accordance with one or more aspects of the present disclosure.

FIG. 6 is a graphical plot illustrating the real voltage magnitude at each bus of the IEEE 33 bus system as well as estimated magnitudes determined using low-observability matrix completion with different numbers of known phasor measurements, in accordance with one or more aspects of the present disclosure. As seen in FIG. 6, the accuracies of the estimation will improve as the number of voltage phasor measurements increase.

One item of note that was not included in these results is that new voltage phasor measurement devices installed into the grid, typically in the form of synchrophasors or microsynchrophasors, have the capability of measuring current as well. Thus, the increase in accuracy due to increasing the number of sensors will be much more significant than these results show.

Another fact that has a significant impact on the accuracy of results is the issue of where new voltage phasor measurement devices are installed. Simply increasing the number of voltage phasor measurements may have a positive impact on the accuracy of the estimations, but the algorithm can be improved optimally when considering where the new voltage phasor measurements should be located.

Figure 7:
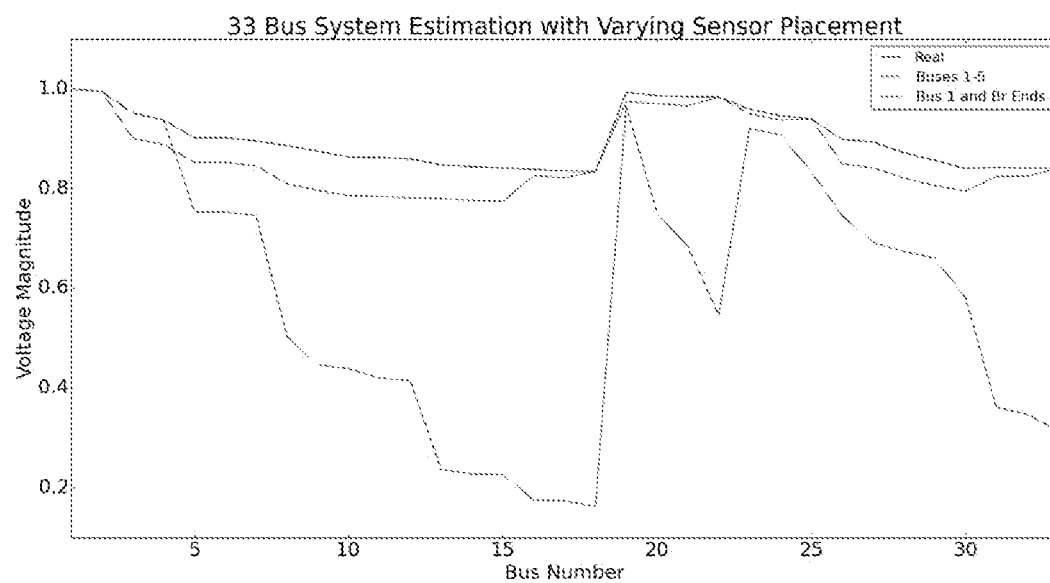
FIG. 7 is a graphical plot illustrating the real voltage magnitude at each bus of the IEEE 33 bus system as well as estimated magnitudes determined using low-observability matrix completion with two different placements of voltage phasor measurement units, in accordance with one or more aspects of the present disclosure.

FIG. 7 is a graphical plot illustrating the real voltage magnitude at each bus of the IEEE 33 bus system as well as estimated magnitudes determined using low-observability matrix completion with two different placements of voltage phasor measurement units, in accordance with one or more aspects of the present disclosure. Specifically, FIG. 7 shows the difference in estimation accuracies in the IEEE 33 Bus system when there are five voltage phasor measurements at the first five buses versus when they are at bus one and at the ending bus of each branch. The results shown in the example of FIG. 7 are without the voltage scaling that was done in the previous radial system results to highlight the significance on placing the measurement devices properly.

It can be seen that when the measurement devices are more spread out, the accuracy is much higher and does not necessarily require, yet would be aided by, voltage range scaling.

Overall, using matrix completion to estimation voltages at all locations will produce accurate results under most circumstances. There are conditions that may cause inaccurate results, but the results obtained with minimal available data are very promising.

Figure 8:
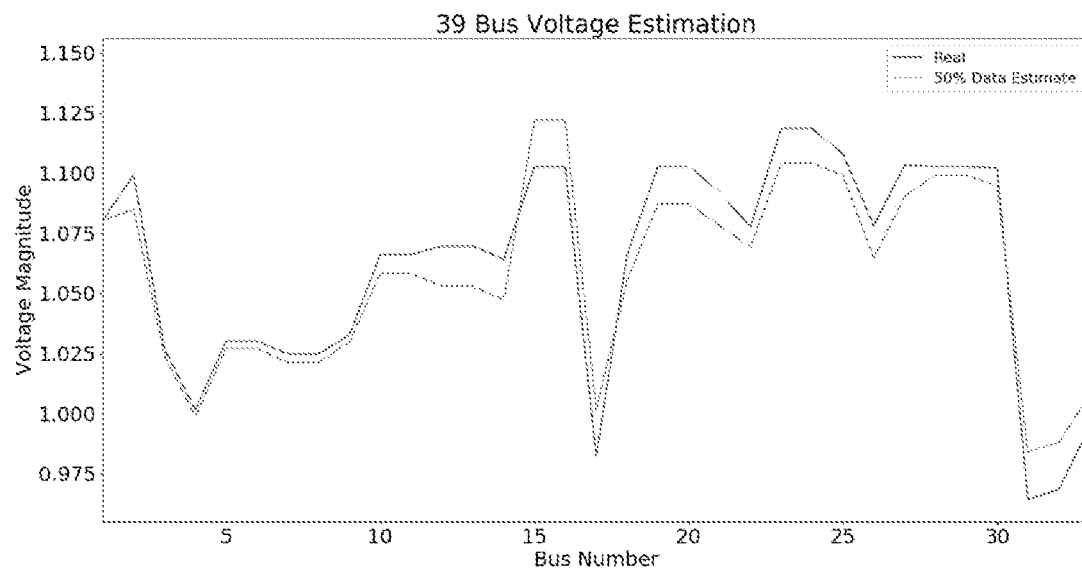
FIG. 8 is a graphical plot illustrating the real voltage magnitude at each bus of the IEEE standard 39 bus mesh system as well as estimated magnitudes determined using low-observability matrix completion, in accordance with one or more aspects of the present disclosure.
Figure 9:
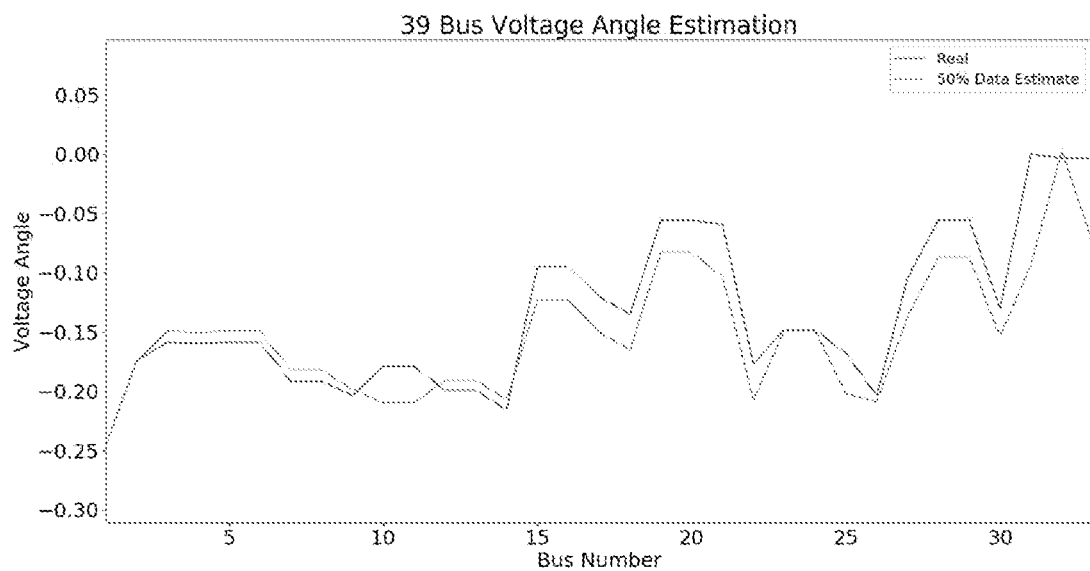
FIG. 9 is a graphical plot illustrating the real voltage angle at each bus of the IEEE 39 bus system as well as estimated angles determined using low-observability matrix completion, in accordance with one or more aspects of the present disclosure.

The same tests were also performed on a mesh network. The test case for the mesh network is the IEEE standard 39 bus system. FIG. 8 is a graphical plot illustrating the real voltage magnitude at each bus of the IEEE standard 39 bus mesh system as well as estimated magnitudes determined using low-observability matrix completion, in accordance with one or more aspects of the present disclosure. FIG. 9 is a graphical plot illustrating the real voltage angle at each bus of the IEEE 39 bus system as well as estimated angles determined using low-observability matrix completion, in accordance with one or more aspects of the present disclosure. While the algorithm does provide accurate results for the mesh network, there is an increase in the computational complexity of the problem.

The original matrix completion algorithm could be applied as-is, without including the additional power system constraints, to the formed matrix for radial systems to estimate voltages with relative accuracy. The advantage of doing this is in the fact that no parameters of the network model are required to obtain results. This might become beneficial when there is no information available about the model or when the information has potential inaccuracies. However, as this requires a very strong correlation between variables within the matrix and a very low rank, it is only possible for radial networks and is highly susceptible to the quantities available for completion.

Figure 10:
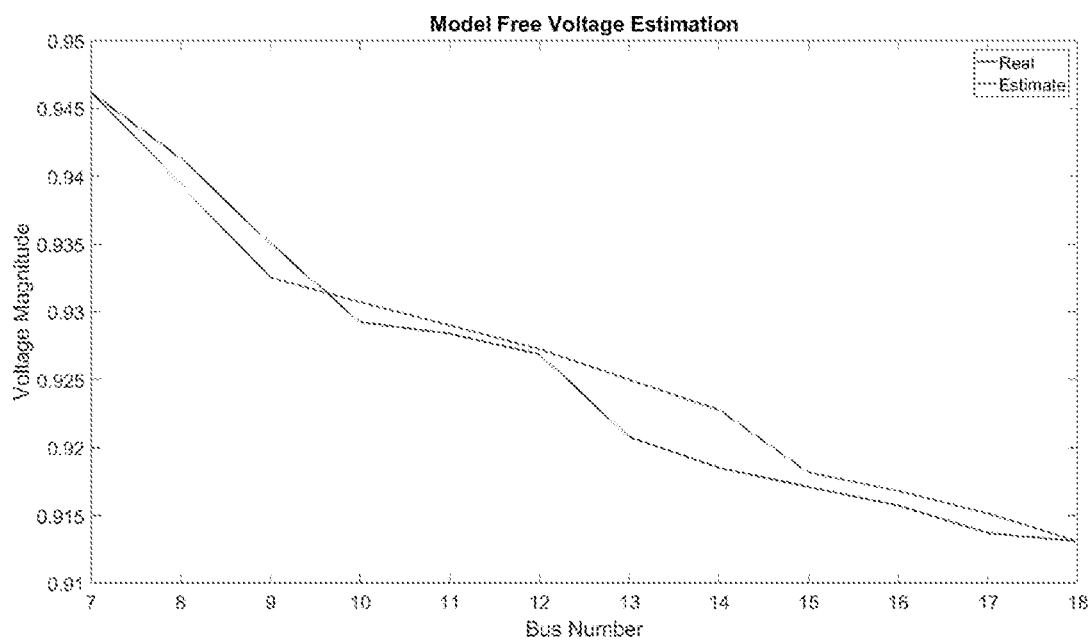
FIG. 10 is a graphical plot illustrating the real voltage magnitude at each bus of the IEEE 39 bus system as well as estimated magnitudes determined using model-free low-observability matrix completion when all matrix elements except voltage are known, in accordance with one or more aspects of the present disclosure.
Figure 11:
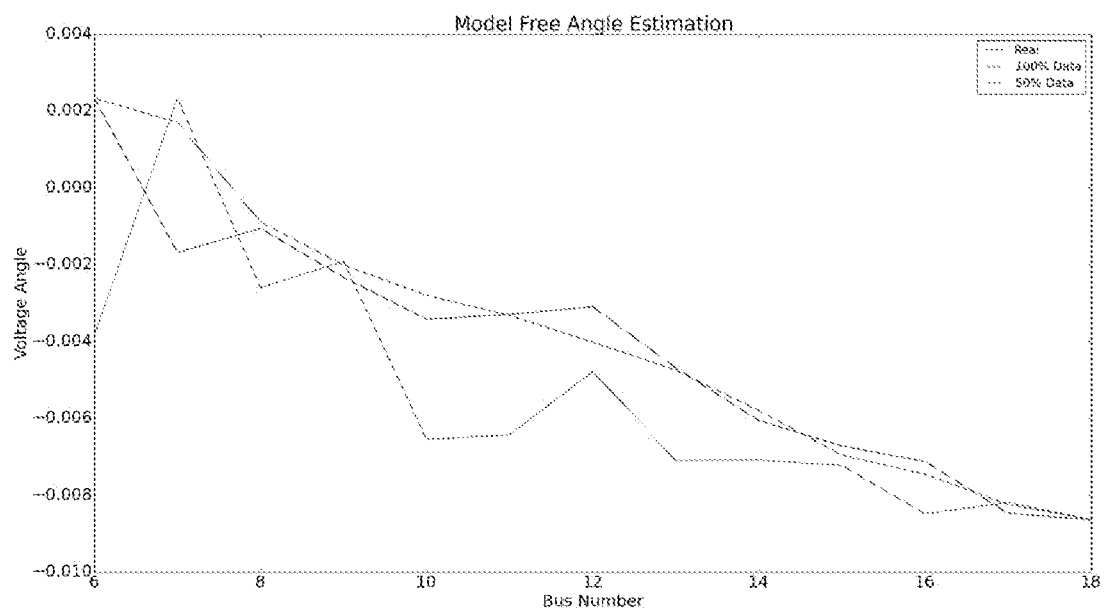
FIG. 11 is a graphical plot illustrating the real voltage angle at each bus of the IEEE 39 bus system as well as estimated angles determined using model-free low-observability matrix completion when all matrix elements except voltage are known, in accordance with one or more aspects of the present disclosure.

Additional steps may be used in order to obtain accurate results without the use of a model. First, the system needs to be split into several clusters which are equivalent to the branches of the system. To obtain accurate results, a separate matrix needs to be constructed for each branch. FIG. 10 is a graphical plot illustrating the real voltage magnitude at each bus of the IEEE 39 bus system as well as estimated magnitudes determined using model-free low-observability matrix completion when all matrix elements except voltage are known, in accordance with one or more aspects of the present disclosure. FIG. 11 is a graphical plot illustrating the real voltage angle at each bus of the IEEE 39 bus system as well as estimated angles determined using model-free low-observability matrix completion when all matrix elements except voltage are known, in accordance with one or more aspects of the present disclosure.

Figure 12:
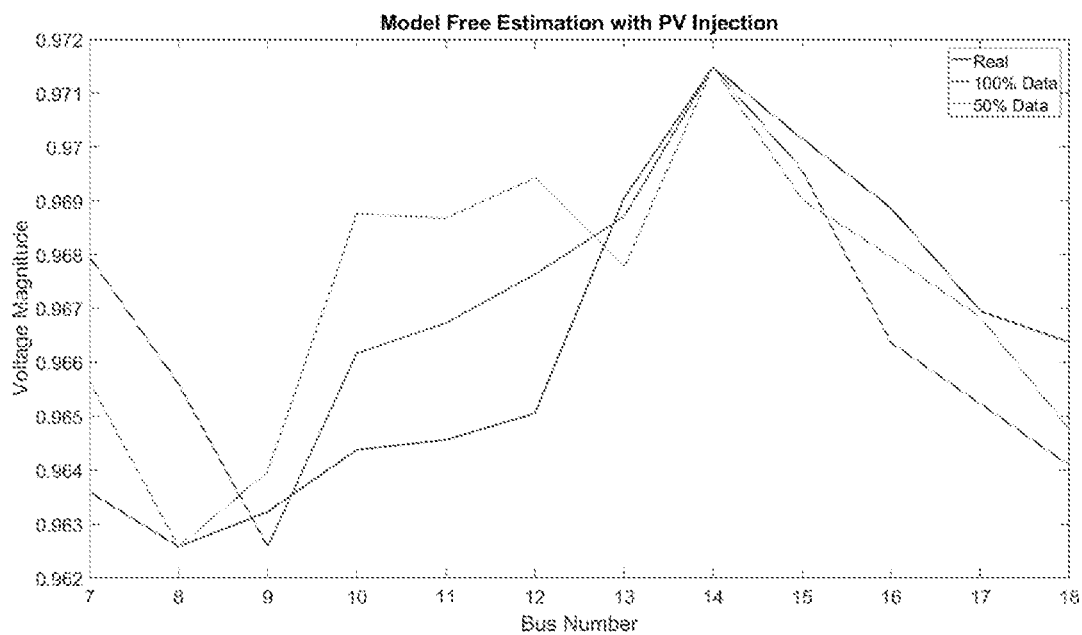
FIG. 12 is a graphical plot illustrating the real voltage magnitude at each bus of the IEEE 39 bus system as well as estimated magnitudes determined using model-free low-observability matrix completion with varying levels of known data, in accordance with one or more aspects of the present disclosure.

Additionally, this procedure will work for systems with slight PV injections and more importantly, when the data is incomplete. FIG. 12 is a graphical plot illustrating the real voltage magnitude at each bus of the IEEE 39 bus system as well as estimated magnitudes determined using model-free low-observability matrix completion with varying levels of known data, in accordance with one or more aspects of the present disclosure. The plot in FIG. 12 shows that the estimations follow the trend relatively accurately for most estimations. The PV injection is at Bus 14. The accuracy of each estimation depends on which data was available at the respective bus. In FIG. 12, this can be seen in the few estimations at the 50% data available which are significantly different from the trend, while some are extremely similar.

Figure 13:
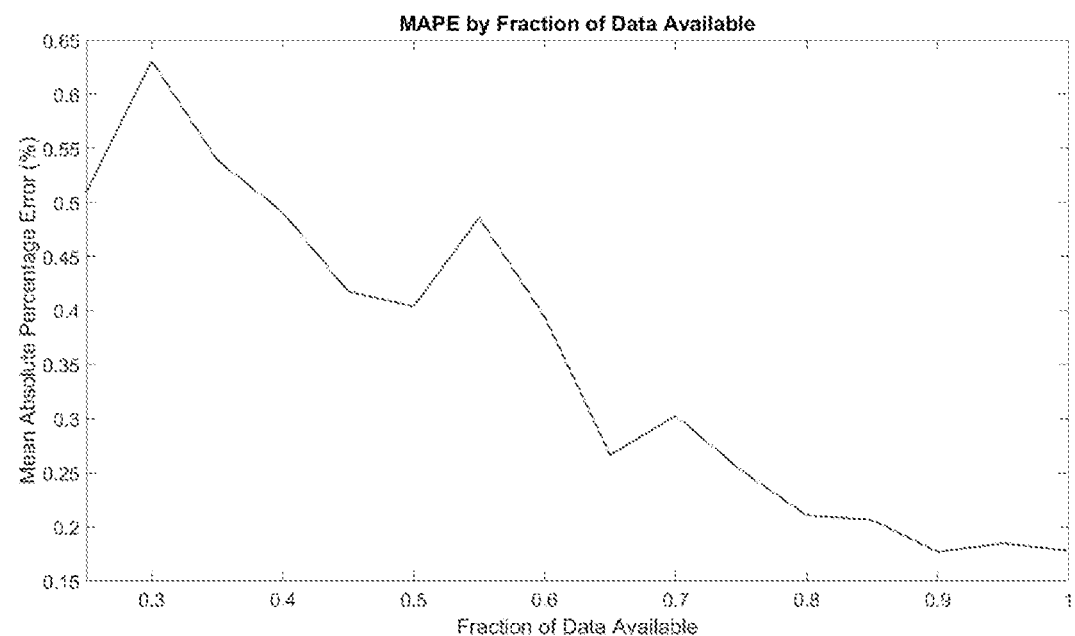
FIG. 13 is a graphical plot illustrating average error as a function of available data when using model-free low observability matrix completion on the IEEE 39 bus system, in accordance with one or more aspects of the present disclosure.

It can also be shown that as the fraction of known elements within the matrix increases, the accuracy of the estimations will increase. FIG. 13 is a graphical plot illustrating average error as a function of available data when using model-free low observability matrix completion on the IEEE 39 bus system, in accordance with one or more aspects of the present disclosure. Specifically, FIG. 13 shows that mean absolute percentage error of the voltage estimates as the number of known elements increases. Even with averaging multiple runs, it can be seen that the estimations will vary significantly depending on which data is available during the estimation.

It should be noted that the inclusion of significant PV or power injections at a node creates a complication in the model-free procedure. The matrix completion techniques will accurately estimate up to the node which contains the PV, but will have significant errors afterwards. This is due to the assumption made of each branch having an individual matrix for completion, as stated previously. When significant PV is present at a node, this essentially causes the branch to be split into two separate branches at the node, since branches are defined by the flow of the current. If the PV injection is large enough such that current flows in both directions out the node, separate matrices need to be made for each side of the node.

Figure 14:
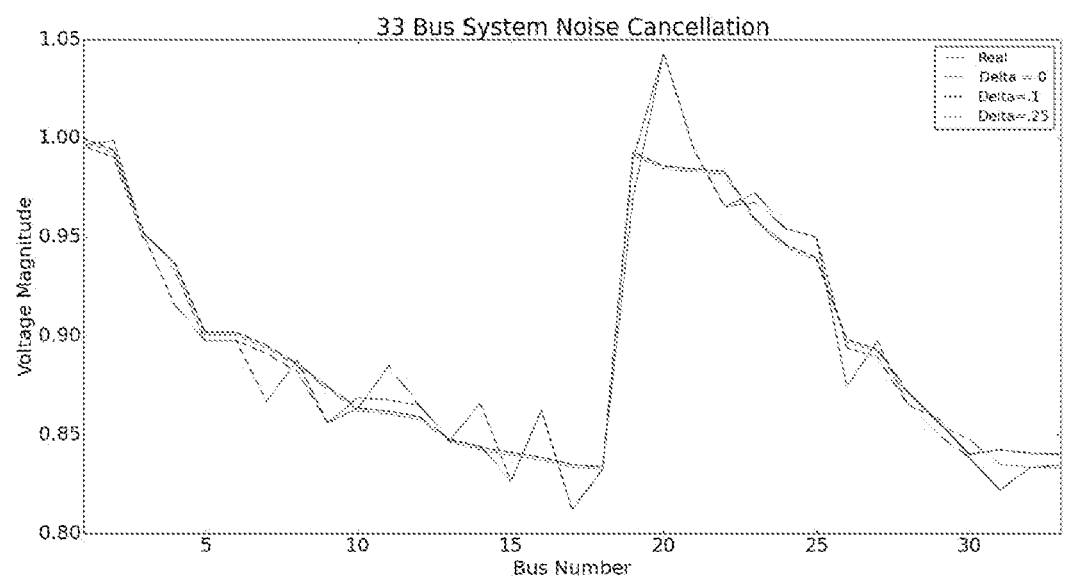
FIG. 14 is a graphical plot illustrating the real voltage magnitude at each bus of the IEEE 39 bus system as well as estimated magnitudes determined using low-observability matrix completion with three different values of δ, in accordance with one or more aspects of the present disclosure.

While low observability cases are the goal of the techniques described herein, the purpose of full observability state estimation is to eliminate errors and noise in the measurements. It can be shown that this approach is also capable of properly dealing with these measurement errors when the parameter is properly tuned. FIG. 14 is a graphical plot illustrating the real voltage magnitude at each bus of the IEEE 39 bus system as well as estimated magnitudes determined using low-observability matrix completion with three different values of δ, in accordance with one or more aspects of the present disclosure. Under the assumption that the noise at all measurements follows a similar distribution, as long as there are enough measurements the algorithm will cancel out the noise. As the number of measurements decreases, this ability becomes diminished. This allows for the computation of traditional state estimation in systems that have sufficient observability as well as the estimation of states in systems that have low observability.

Figure 15:
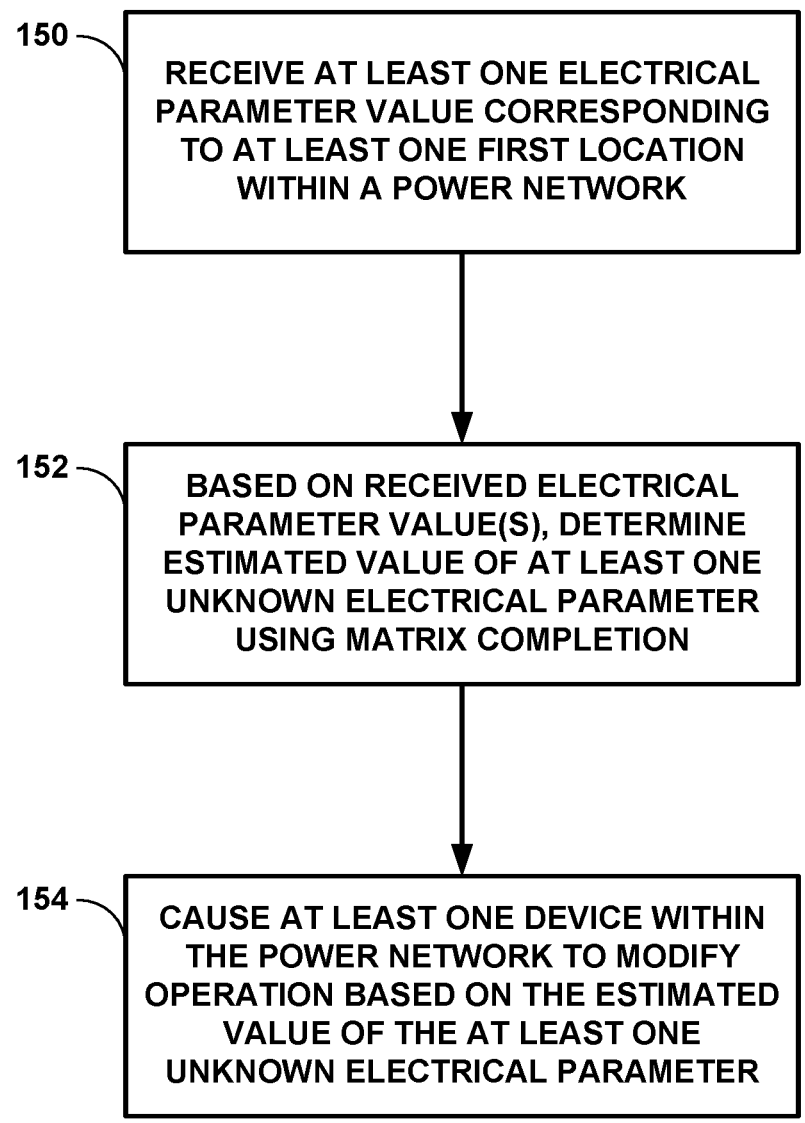
FIG. 15 is a flow diagram illustrating example operations for performing network management using low-observability matrix completion, in accordance with one or more aspects of the present disclosure.

FIG. 15 is a flow diagram illustrating example operations for performing network management using low-observability matrix completion, in accordance with one or more aspects of the present disclosure. FIG. 15 represents only one example process for performing network management using low-observability matrix completion, and various other or additional operations may be used in other examples. The example operations of FIG. 15 are described below within the context of FIG. 1.

In the example of FIG. 15, a distribution network management system may receive at least one electrical parameter value corresponding to at least one first location within a power network (150). Distribution network management system 4, for instance, may receive electrical parameter values 12A and 12C.

The distribution network management system may determine, using matrix completion and based on the at least one electrical parameter value, an estimated value of at least one unknown electrical parameter (152). The at least one unknown electrical parameter may correspond to a second location within the power network. For instance, distribution network management system 4 may utilize the low-observability matrix completion techniques detailed herein to determine an estimated electrical parameter value corresponding to the location of node 6B.

In the example of FIG. 15, the distribution network management system may cause at least one device within the power network to modify operation based on the estimated value of the at least one unknown electrical parameter. For instance, distribution network management system 4 may generate control instructions 14 based at least in part on the estimated electrical parameter value. Distribution network management system 4 may output control instructions 14 to network devices 10, thereby causing one or more of network devices 10 to modify its operation.

The example operations of FIG. 15 may be performed in an iterative fashion. That is, while only a single flow is shown, each of operations 150, 152, and/or 154 may be performed any number of times. In some examples, the operations may be performed periodically. In some examples, the operations may be performed in an on-demand fashion.

The techniques of the present disclosure may additionally or alternatively be described by one or more of the following examples.

Example 1

A device comprising: at least one processor configured to: receive at least one electrical parameter value corresponding to at least one first location within a power network; determine, using matrix completion, based on the at least one electrical parameter value, an estimated value of at least one unknown electrical parameter, wherein the at least one unknown electrical parameter corresponds to a second location within the power network; and cause at least one device within the power network to modify operation based on the estimated value of the at least one unknown electrical parameter.

Example 2

The device of example 1, wherein determining the estimated value of the at least one unknown electrical parameter comprises solving an optimization problem comprising at least one constraint representation.

Example 3

The device of example 2, wherein the at least one constraint representation comprises at least one relaxed version of a constraint representation that is bounded by an error tolerance value.

Example 4

The device of any of examples 2-3, wherein the at least one constraint representation represents at least one of: respective net real power flowing into and out of each location within the power network being zero; or respective net reactive power flowing into and out of each location within the power network being zero.

Example 5

The device of any of examples 2-4, wherein the at least one constraint representation represents correlation between respective voltages, currents, and impedances at each location within the power network.

Example 6

The device of any of examples 1-5, wherein determining the estimated value of the at least one unknown electrical parameter comprises: determining a raw estimated value using matrix completion; and applying a scaling factor to the raw estimated value to obtain the estimated value.

Example 7

The device of any of examples 1-6, wherein each electrical parameter value in the at least one electrical parameter value comprises a respective value of a parameter of the power network that is correlated with a voltage parameter of the power network.

Example 8

The device of example 7, wherein the at least one electrical parameter value comprises at least one of: a value of real voltage from a source bus of a line in the power network; a value of reactive power from the source bus; a value of total real power entering the source bus from all sources; a value of total reactive power entering the source bus from all sources; a value of real current flowing through the line; a value of reactive current flowing through the line; a value of power flowing through the line; a value of load at the source bus; or a value of voltage magnitude at the source bus.

Example 9

The device of any of examples 1-8, wherein: receiving the at least one electrical parameter value comprises receiving a first number of electrical parameter values; and determining the estimated value of at least one unknown electrical parameter comprises determining an estimated value of a second number of unknown electrical parameters, the second number being larger than the first.

Example 10

A method comprising: receiving, by a power network management system comprising at least one processor, at least one electrical parameter value corresponding to at least one first location within a power network; determining, by the power network management system, using matrix completion, based on the at least one electrical parameter value, an estimated value of at least one unknown electrical parameter, wherein the at least one unknown electrical parameter corresponds to a second location within the power network; and causing, by the power network management system, at least one device within the power network to modify operation based on the estimated value of the at least one unknown electrical parameter.

Example 11

The method of example 10, wherein determining the estimated value of the at least one unknown electrical parameter comprises solving an optimization problem comprising at least one constraint representation.

Example 12

The method of example 11, wherein the at least one constraint representation comprises at least one relaxed version of a constraint representation that is bounded by an error tolerance value.

Example 13

The method of any of examples 11-12, wherein the at least one constraint representation represents at least one of: respective net real power flowing into and out of each location within the power network being zero; or respective net reactive power flowing into and out of each location within the power network being zero.

Example 14

The method of any of examples 11-13, wherein the at least one constraint representation represents correlation between respective voltages, currents, and impedances at each location within the power network.

Example 15

The method of any of examples 10-14, wherein determining the estimated value of the at least one unknown electrical parameter comprises: determining a raw estimated value using matrix completion; and applying a scaling factor to the raw estimated value to obtain the estimated value.

Example 16

The method of any of examples 10-15, wherein each electrical parameter value in the at least one electrical parameter value comprises a respective value of a parameter of the power network that is correlated with a voltage parameter of the power network.

Example 17

The method of example 16, wherein the at least one electrical parameter value comprises at least one of: a value of real voltage from a source bus of a line in the power network; a value of reactive power from the source bus; a value of total real power entering the source bus from all sources; a value of total reactive power entering the source bus from all sources; a value of real current flowing through the line; a value of reactive current flowing through the line; a value of power flowing through the line; a value of load at the source bus; or a value of voltage magnitude at the source bus.

Example 18

The method of any of examples 10-17, wherein: receiving the at least one electrical parameter value comprises receiving a first number of electrical parameter values; and determining the estimated value of at least one unknown electrical parameter comprises determining an estimated value of a second number of unknown electrical parameters, the second number being larger than the first.

The continued increase of deployment of distributed generation in power distribution networks has continued to increase the need for accurate knowledge of the current state of the network. Unfortunately, the vast size of distribution networks causes the instillation of the required number of measurements for traditional state estimation to be infeasible. Thus the need for low-observability state estimators has become apparent.

The techniques of the present disclosure uses auxiliary measurements in the form of smart meters, PV inverters, etc., to supplement the information about the system for the completion of state estimation. These measurements are then applied to a matrix completion algorithm which estimates the unknown quantities. With a focus on the voltage phasor, it is shown that even under scenarios with very low observability, the voltage phasor is obtainable with relative accuracy. Estimated unknown quantities may be used in various ways, including to cause one or more devices within the distribution network to modify operation as detailed herein.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
   at least one processor configured to:
      receive at least one electrical parameter value corresponding to at least one first location within a power distribution network at a first time;
      determine, based on the at least one electrical parameter value, an estimated value of at least one unknown electrical parameter at the first time, wherein the at least one unknown electrical parameter corresponds to a second location within the power distribution network, and wherein determining the estimated value of the at least one unknown electrical parameter comprises performing matrix completion on a matrix of electrical parameters in the power distribution network corresponding to the first time, including the at least one electrical parameter value; and
      cause at least one device within the power distribution network to modify operation based on the estimated value of the at least one unknown electrical parameter, wherein:
         receiving the at least one electrical parameter value comprises receiving a first number of electrical parameter values corresponding to the first time;
         determining the estimated value of the at least one unknown electrical parameter comprises determining an estimated value of a second number of unknown electrical parameters at the first time, the second number being larger than the first; and
         wherein determining the estimated value of the at least one unknown electrical parameter comprises solving $$\min_{X \in \mathbb{R}^{n_1 \times n_2}, \{\epsilon_{f,t}\}, \{\tau_f\}} \|X\|_* + w_1 \Sigma_{(f,t) \in \mathcal{L}} \epsilon_{f,t} + w_2 \Sigma_{f \in N} \tau_f + w_3 \gamma + w_4 \alpha,$$

subject to the following constraints:
$\|X_\Omega - D_\Omega\|_F \leq \delta$;
a constraint that correlates respective voltages, currents, and impedances for each line (f,t) within a first error tolerance, $\epsilon_{f,t}$;
constraints that respective net real power flowing into and out of each location f be within a second error tolerance, $\tau_f$;
$\epsilon_{f,t} \geq 0$ for each line (f,t);
$\tau_f \geq 0$ for each location f;
$\|v - Mx - w\|_\infty \leq \gamma$; and
$\||v| - Kx - |w|\|_\infty \leq \alpha$,
wherein:
X represents a matrix of electrical parameter values including the estimated value of the at least one unknown electrical parameter;
D represents a matrix of known electrical parameter values, including the at least one electrical parameter value;
$n_1$ represents a number of lines in the power distribution network;
$n_2$ represents a number of electrical parameters used for estimation;
L represents the set of lines in the power distribution network;
N represents the set of locations in the power distribution network;
γ represents a third error tolerance;
α represents a fourth error tolerance;
$w_1$, $w_2$, $w_3$, and $w_4$ represent weighting parameters used to tune accuracy;
Ω represents observed values of electrical parameters, including the at least one electrical parameter value;
$X_\Omega$ and $D_\Omega$ represent X and D, respectively, with zero elements corresponding to the locations of unobserved electrical parameters;
δ represents a tolerance value for measurement noise;
v represents a vector collecting voltage phasors at all locations;
M represents a first constant matrix, related to linear power flow equations;
x represents a vector collecting active and reactive power injections at all locations;
w represents a vector of constants;
|84| represents a vector collecting voltage magnitudes at all locations;
K represents a constant matrix; and
|w| represents a norm of w.

2. The device of claim 1, wherein determining the estimated value of the at least one unknown electrical parameter comprises:

determining a raw estimated value using matrix completion; and applying a scaling factor to the raw estimated value to obtain the estimated value.

3. The device of claim 1, wherein each electrical parameter value in the at least one electrical parameter value comprises a respective value of a parameter of the power distribution network that is correlated with a voltage parameter of the power distribution network.

4. The device of claim 3, wherein the at least one electrical parameter value comprises at least one of:
a value of real voltage from a source bus of a line in the power distribution network;
a value of reactive power from the source bus;
a value of total real power entering the source bus from all sources;
a value of total reactive power entering the source bus from all sources;
a value of real current flowing through the line;
a value of reactive current flowing through the line;
a value of power flowing through the line;
a value of load at the source bus; or
a value of voltage magnitude at the source bus.

5. The device of claim 1, wherein determining the estimated value of the at least one unknown electrical parameter does not rely on electrical parameter values from a second time that is different from the first time.

6. The device of claim 1, wherein determining the estimated value of the at least one unknown electrical parameter comprises performing matrix completion on a matrix in which each row represents a line in the power distribution network, the matrix comprising the following columns:
a column representing, for lines in the power distribution network, a respective real voltage from a source bus of the line;
a column representing, for the lines, a respective reactive power from the source bus of the line;
a column representing, for the lines, a respective total real power entering the source bus of the line from all sources;
a column representing, for the lines, a respective total reactive power entering the source bus of the line from all sources;
a column representing, for the lines, a respective real current flowing through the line;
a column representing, for the lines, a respective reactive current flowing through the line;
a column representing, for the lines, a respective power flowing through the line;
a column representing, for the lines, a respective load at the source bus; and
a column representing, for the lines, a respective voltage magnitude at the source bus.

7. A method comprising:
receiving, by a power network management system comprising at least one processor, at least one electrical parameter value corresponding to at least one first location within a power distribution network at a first time;
determining, by the power distribution network management system, based on the at least one electrical parameter value, an estimated value of at least one unknown electrical parameter at the first time, wherein the at least one unknown electrical parameter corresponds to a second location within the power distribution network, and wherein determining the estimated value of the at least one unknown electrical parameter comprises performing matrix completion on a matrix of electrical parameters in the power distribution network corresponding to the first time, including the at least one electrical parameter value; and
causing, by the power network management system, at least one device within the power distribution network to modify operation based on the estimated value of the at least one unknown electrical parameter,
wherein:
receiving the at least one electrical parameter value comprises receiving a first number of electrical parameter values corresponding to the first time;
determining the estimated value of the at least one unknown electrical parameter comprises determining an estimated value of a second number of unknown electrical parameters as the first time, the second number being larger than the first; and
wherein determining the estimated value of the at least one unknown electrical parameter comprises solving $$\min_{X \in \mathbb{R}^{n_1 \times n_2}, \{\epsilon_{f,t}\}, \{\tau_f\}} \|X\|_* + w_1 \Sigma_{(f,t) \in \mathcal{L}} \epsilon_{f,t} + w_2 \Sigma_{f \in \mathcal{N}} \tau_f + w_3 \gamma + w_4 \alpha,$$

subject to the following constraints:
$\|X_\Omega - D_\Omega\|_f \le \delta$;
a constraint that correlates respective voltages, currents, and impedances for each line (f,t) within a first error tolerance, $\epsilon_{f,t}$;
constraints that respective net real power flowing into and out of each location f be within a second error tolerance, $\tau_f$;
$\epsilon_{f,t} \ge 0$ for each line (f,t);
$\tau_f \ge 0$ for each location f;
$\|v - Mx - w\|_\infty \le \gamma$; and
$\||v| - Kx - |w|\|_\infty \le \alpha$,
wherein:
X represents a matrix of electrical parameter values including the estimated value of the at least one unknown electrical parameter;
D represents a matrix of known electrical parameter values, including the at least one electrical parameter value;
$n_1$ represents a number of lines in the power distribution network;
$n_2$ represents a number of electrical parameters used for estimation;
L represents the set of lines in the power distribution network;
N represents the set of locations in the power distribution network;
$\gamma$ represents a third error tolerance;
$\alpha$ represents a fourth error tolerance;
$w_1$, $w_2$, $w_3$, and $w_4$ represent weighting parameters used to tune accuracy;
$\Omega$ represents observed values of electrical parameters, including the at least one electrical parameter value;
$X_\Omega$ and $D_\Omega$ represent X and D, respectively, with zero elements corresponding to the locations of unobserved electrical parameters;
$\delta$ represents a tolerance value for measurement noise;
v represents a vector collecting voltage phasors at all locations;
M represents a first constant matrix, related to linear power flow equations;

x represents a vector collecting active and reactive power injections at all locations;

w represents a vector of constants;

|v| represents a vector collecting voltage magnitudes at all locations;

K represents a constant matrix; and

|w| represents a norm of w.

8. The method of claim 7, wherein determining the estimated value of the at least one unknown electrical parameter comprises:

determining a raw estimated value using matrix completion; and applying a scaling factor to the raw estimated value to obtain the estimated value.

9. The method of claim 7, wherein each electrical parameter value in the at least one electrical parameter value comprises a respective value of a parameter of the power distribution network that is correlated with a voltage parameter of the power distribution network.

10. The method of claim 9, wherein the at least one electrical parameter value comprises at least one of:

a value of real voltage from a source bus of a line in the power distribution network;

a value of reactive power from the source bus;

a value of total real power entering the source bus from all sources;

a value of total reactive power entering the source bus from all sources;

a value of real current flowing through the line;

a value of reactive current flowing through the line;

a value of power flowing through the line;

a value of load at the source bus; or a value of voltage magnitude at the source bus.

11. The method of claim 7, wherein determining the estimated value of the at least one unknown electrical parameter does not rely on electrical parameter values from a second time that is different from the first time.

* * * * *